Figure 1:
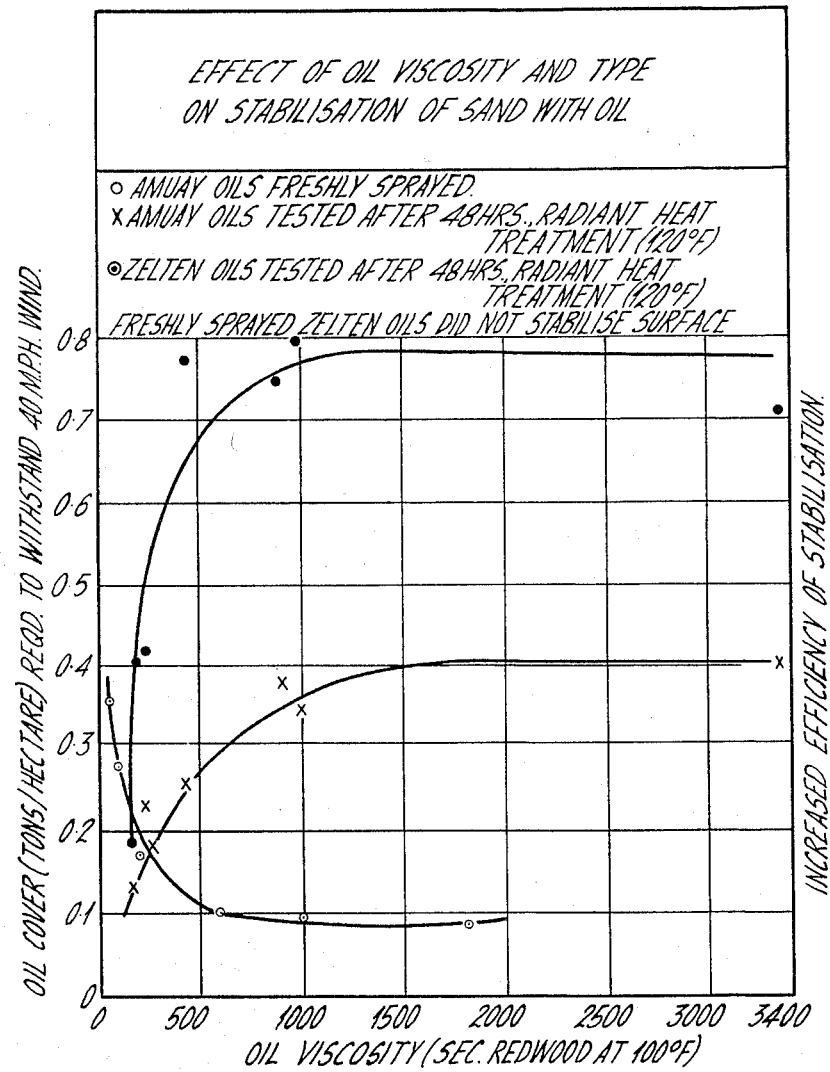

Nov. 1, 1966   T. L. LES   3,281,986
DUNE STABILISATION

Filed July 12, 1963   4 Sheets-Sheet 4

Tadeusz Leon Les   Inventor

By W. V. T Heilman

Patent Attorney

United States Patent Office 3,281,986
Patented Nov. 1, 1966

3,281,986
DUNE STABILISATION
Tadeusz L. Les, Drayton, England, assignor to Esso Research and Engineering Company, a corporation of Delaware
Filed July 12, 1963, Ser. No. 294,505
Claims priority, application Great Britain, July 19, 1962, 27,827/62, 27,828/62, 27,830/62
1 Claim. (Cl. 47—9)

This invention relates to a means for and method of soil stabilisation which assists in the reclaiming of the soil for afforestation, pasturage and agriculture. The invention is applicable to the stabilisation of top soil liable to be moved under the action of wind, or of water, for example, to the stabilisation of sand dune formations.

Major problems of great economic importance are posed in many parts of the world by the movement of surface soils. Such problems include the encroachment of sand dunes on to valuable land and the loss of valuable land by erosion of the top soil. A complementary problem is that of reclaiming wind or water eroded waste land and of bringing it into economic use.

The present invention has a particular application to sand dune country although it will be appreciated, from the description of the invention that follows hereinafter, that the invention is applicable to any top soil that is liable to be moved or removed significantly under the influence of wind or water.

Sand dunes can be classified into two main types, maritime and continental. Maritime dunes are composed of sand originally deposited on the sea-shore and transported inland by wind action. The sand is composed mainly of silica, is coarse in texture, and is poorly retentive of moisture. This latter disability is aggravated when the soils concerned are located in hot climates. This, in addition to the fact that such dunes generally contain only very small amounts of plant nutrients, makes the establishment of vegetation very difficult. In strong winds the coarse sand particles, which are characteristic of maritime dunes, acquire a high momentum and very severe sand blasting of any vegetation in the path of the wind-blown sand occurs.

Continental dunes arise from the wind erosion of over grazed or intensively cultivated soil, or of soil that has been too severely de-afforested, and their formation is often accentuated by accompanying water erosion. In the circumstances of continental dune formation fine clay is carried away by the wind leaving the coarser constituents to be formed into dunes. In general, the sand particles of continental dunes are relatively small and, in addition, contain more plant nutrients than maritime dunes although such dunes, by the nature of their method of formation, will still be deficient in essential nutrients. Although continental dunes are moved, even by moderate winds, the momentum of the individual sand particles is, on the whole, lower than those of maritime dunes and the sand blasting effect is consequently reduced. In some areas, for example areas close to the sea or to the sites of former seas, continental and maritime dunes can merge together.

The shape of dunes in different areas depends upon the distribution of wind velocities in the area. If the wind blows predominantly from a single direction the dunes tend to form into long sand ridges rising gently on the windward side and dropping abruptly into a slip face on the leeward side. This type of formation is particularly typical of maritime dunes. If the wind tends to change in direction, the dunes tend to assume the shape of irregular hills separated by hollows, saddles and slip faces. As the wind direction changes the shape of the dunes alters and the old slip faces can be obliterated, and new ones formed, in a single day.

Amongst methods adopted in the past for soil stabilisation and reclamation have been to plant vegetation such as grasses and vines, or trees, of a selected type on the unstable soil in an endeavour to bind the soil and to form wind breaks to reduce further erosion. These methods can only succeed where the soil movement is sufficiently slow to allow the selected vegetation to become established and where sufficient moisture is available to nourish the planted vegetation. In country such as dune country these methods must be preceded by primary stabilisation. Conventional methods of primary stabilisation intended to create favourable conditions for the establishment of vegetation consist in the erection of wind breaks using dead grasses, cane or brushwood. In some parts of the world dead grasses are planted in a criss-cross pattern over a large area of dune surface. This procedure is known as "dissing". In areas where very pronounced wind action occurs brushwood fences, four to five feet in height, are used in place of grasses. An alternative method is to lay brushwood over the whole ground surface. This method is referred to as "thatching".

It will be seen from the foregoing that the problems confronting soil, particularly sand dune, stabilisation are formidable. The methods which, over a long period of time, have been previously employed are laborious, time consuming and expensive and they are of limited application, are often unsuccessful and, where large areas are involved, as in North Africa, the problem is incapable of solution, except on a most limited scale, by methods previously known and used.

For effective soil, particularly dune, stabilisation, the means employed should prevent or restrict surface soil movement under the action, particularly of wind, but also of rain, sufficiently to allow planted vegetation or seeds to become established; such means desirably should retard the evaporation of ground moisture but not unduly impede the entry of rain or irrigation water; they should permit the soil to breathe and should not deleteriously affect the vegetation that is to be established or the fertility of the soil to which the means are applied. It has been found, furthermore, that the stabilizing means should penetrate the soil to which the means is applied to some extent and form films that have a resistance to wind and water action. It has now been found, surprisingly, that the foregoing requirements may be fulfilled by selecting, and applying to the unstable soil in an appropriate manner, certain hydrocarbon petroleum products that are liquid at ambient temperatures, such as residual petroleum oils, for example straight-run oils, having a viscosity of 200 to 10,000 seconds Redwood I at 100° F., and preferably of 200 to 1,200 seconds Redwood at 100° F. Although cracked petroleum oils may be used, it is preferred to employ straight run oils since cracked products are harmful to some forms of plant life and may have some deleterious effect upon the fertility of the soil. The stabilising oils of the invention contain fractions some of which may boil below 350° C. whilst the remainder boil above 350° C. The ratio of the oils boiling below 350° C. to those boiling above this temperature should be such that the oils meet the Redwood viscosities above specified.

It has been ascertained, further, that petroleum oils, such as Zelten oils, which contain appreciable amounts of waxes, are markedly superior to petroleum oils, such as Amuay oils, that have little or no wax content. However, if waxes, suitably petroleum waxes, are added to wax deficient oils of, for example, the Amuay type, their effectiveness is considerably improved.

The invention is illustrated by reference to petroleum oils derived from Zelten crude, having a high pour point and a low asphaltene content and, by comparing its performance with that of oils derived from heavy Amuay petroleum oil having a low pour point and a high asphaltene content.

Figure 2:
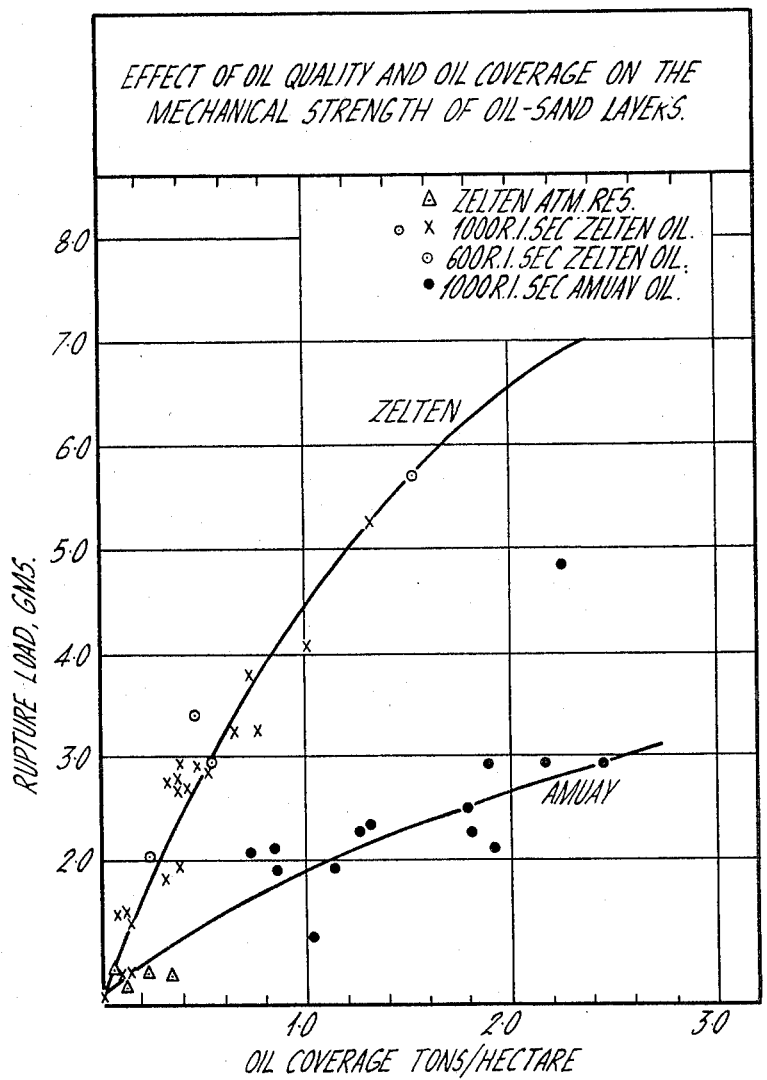
Figure 3:
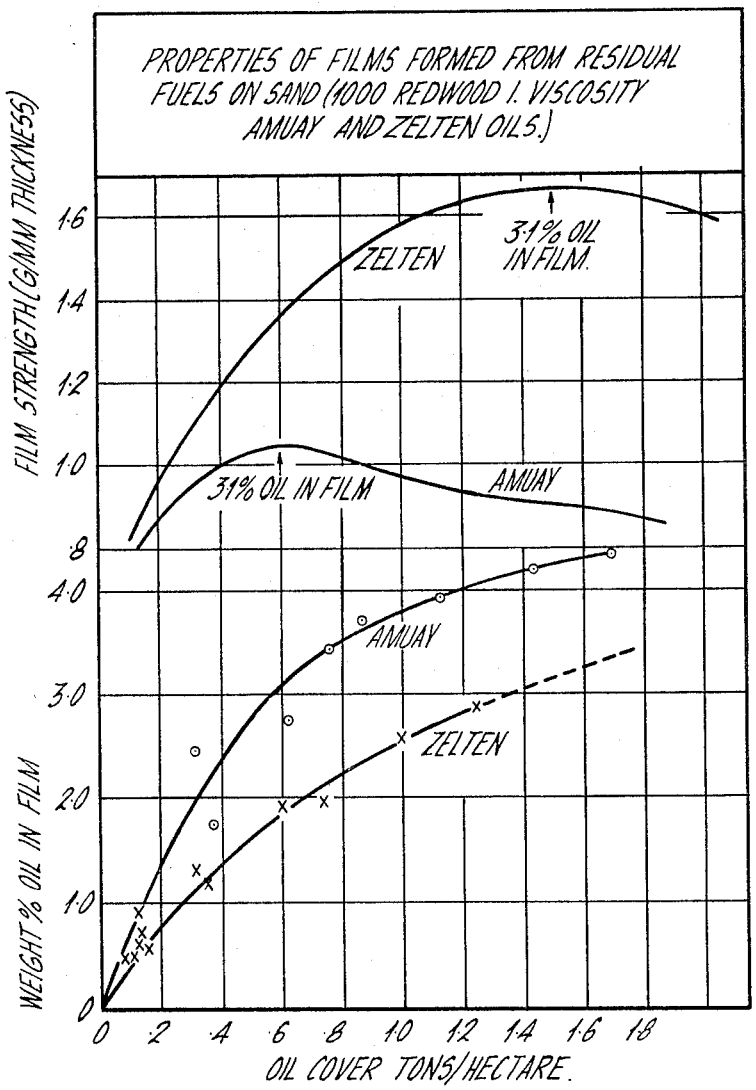
Figure 4:
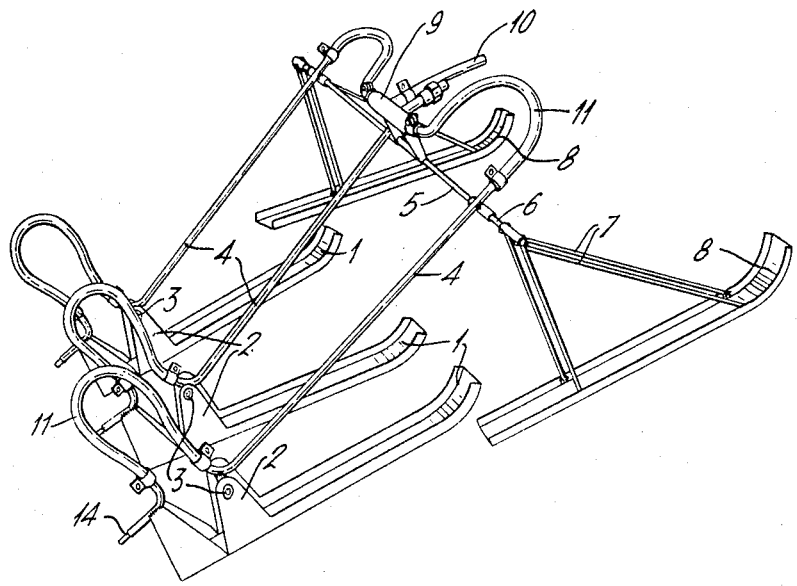
Figure 5:
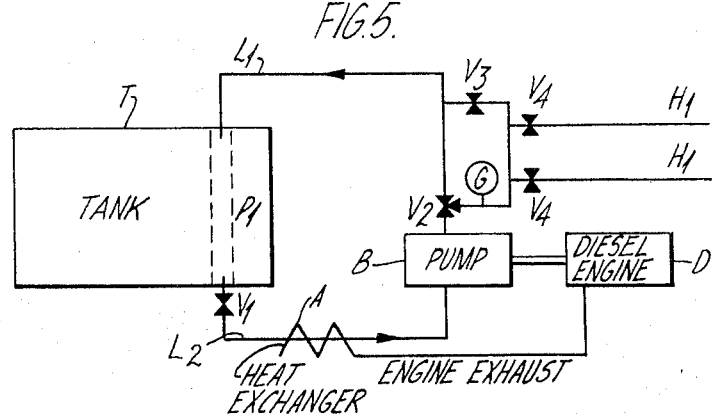

In the accompanying drawings:

FIGURE 1 shows the relationship between oil viscosity and type on stabilisation, FIGURE 2 shows the mechanical strength of stabilising oil films based on type, viscosity and coverage, FIGURE 3 shows the properties of films based on oil type and coverage, FIGURE 4 illustrates an example form of a spray boom, and FIGURE 5 is a diagrammatic layout illustrating suitable oil spraying equipment.

Table I and FIGURE 1 show the oil cover of different viscosity Zelten and Amuay oils required to withstand a wind of 40 m.p.h. when applied to sand dunes.

TABLE I.—EFFECT OF OIL VISCOSITY AND TYPE ON STABILIZATION OF SAND WITH OIL

| Oil employed | Oil viscosity secs. Redwood I at 100° F. | Oil cover (tons/hectare) required to withstand 40 m.p.h. wind | |
|---|---|---|---|
| | | Oils freshly sprayed | Oils tested after 48-64 hours radiant heat [1] (120° F.) |
| Amuay Oils | 180 | 0.190 | 0.126 |
| Do | 213 | 0.410 | 0.226 |
| Do | 230 | 0.420 | 0.175 |
| Do | 425 | 0.774 | 0.260 |
| Do | 884 | 0.750 | 0.375 |
| Do | 1,040 | 0.800 | 0.360 |
| Do | 3,400 | 0.700 | 0.400 |
| Zelten Oils | 70 | 0.250 | 0.360 |
| Do | 110 | 0.110 | 0.280 |
| Do | 200 | (2) | 0.170 |
| Do | 600 | (2) | 0.100 |
| Do | 1,050 | (2) | 0.095 |
| Do | 1,800 | (2) | 0.080 |

[1] Radiant heat was applied in laboratory experiments to simulate the rays of the sun.
[2] Dunes failed at 20 m.p.h.

On freshly sprayed dune surfaces oil type, viscosity, and the sun's rays all have a marked effect on stabilising efficiency, as will be seen by reference to Table I and FIGURE 1. It will be seen that considerably smaller amounts of a wax containing oil, such as Zelten, are required to stabilise a sand dune under the action of a 40 m.p.h. wind than of a non-waxy oil, such as an Amuay oil. It will be further seen that the stabilising properties of both oils are improved by radiant heat treatment, for example at 120° F. It has been found that, by storing the oils at a temperature in excess of 75° F., for periods of more than 48 hours, improved penetration of the oil into the sand is obtained and stabilisation enhanced. As shown in FIGURE 1, the waxy Zelten oil approached its maximum effectiveness at a Redwood I (100° F.) viscosity of about 600 and that, when viscosity was increased beyond this point, the effectiveness remained substantially constant. In the case of the Amuay oil effectiveness increased as viscosity decreased towards 200 seconds Redwood I at 100° F.

The behaviour of Zelten and Amuay oils was further investigated by spraying the oils on to sand surfaces, subjecting to radiant heating, and measuring the force required to pull a wire ring of 1.3 cm. diameter clear of the oil/sand layer. The results obtained are shown in Table II and FIGURE 2.

TABLE II.—MECHANICAL STRENGTH OF VARIOUS OIL-SAND LAYERS, AFTER RADIANT HEAT TREATMENT AT 49° C. FOR 48 HOURS

| Oil employed | Oil coverage, tons/hectare | Rupture load, gms. |
|---|---|---|
| Zelten Atmospheric Residuum | 0.046 | 0.90 |
| Do | 0.122 | 0.81 |
| Do | 0.220 | 0.99 |
| 1,000 sec | 0.089 | 0.95 |
| Redwood I Zelten Oil | 0.091 | 1.50 |
| Do | 0.110 | 1.50 |
| Do | 0.110 | 0.90 |
| Do | 0.140 | 1.45 |
| Do | 0.304 | 1.82 |
| Do | 0.347 | 2.87 |
| Do | 0.366 | 2.75 |
| Do | 0.380 | 2.80 |
| Do | 0.390 | 1.95 |
| Do | 0.400 | 2.93 |
| Do | 0.406 | 2.70 |
| Do | 0.497 | 2.90 |
| Do | 0.512 | 2.89 |
| Do | 0.660 | 3.35 |
| Do | 0.745 | 3.80 |
| Do | 0.780 | 3.30 |
| Do | 1.040 | 4.10 |
| Do | 1.310 | 5.29 |
| 600 sec | 0.230 | 2.05 |
| Redwood I Zelten Oil | 0.466 | 3.40 |
| Do | 0.520 | 2.75 |
| Do | 1.490 | 8.15 |
| Do | 1.550 | 5.78 |
| 1,000 sec | 0.334 | 0.90 |
| Redwood I Amuay Fuel | 0.720 | 2.06 |
| Do | 0.830 | 1.85 |
| Do | 0.840 | 2.15 |
| Do | 1.020 | 1.25 |
| Do | 1.120 | 1.85 |
| Do | 1.250 | 2.33 |
| Do | 1.260 | 2.35 |
| Do | 1.780 | 2.53 |
| Do | 1.800 | 2.24 |
| Do | 1.870 | 2.99 |
| Do | 1.90 | 2.13 |
| Do | 2.18 | 2.89 |
| Do | 2.23 | 4.94 |
| Do | 2.44 | 2.95 |

It will be seen, by reference to Table II and FIGURE 2 that oil films formed from a wax-containing oil such as a Zelten oil using oils of Redwood I (100° F.) viscosity of 600, and 1,000, have a markedly superior strength to those formed from a low wax content oil such as an Amuay oil of Redwood I (100° F.) viscosity of 1,000.

The percentage by weight of the oil in the oil-sand layer was determined by isolation of the oil film and extraction of the oil. From this figure, knowing the quantity of the oil per unit area, and the bulk density of the sand, the thickness of the sand/oil layer was calculated; this enabled the total film strength and the strength of unit thickness of the film to be deduced. The results of this work are shown in FIGURE 3 from which it can be seen that both Zelten and Amuay oils produce a film of optimum strength when the oil concentration in the film reaches about 3.1% and that, thereafter, the film strength, referred in gms/mm. thickness, begins to decrease. The film produced by Zelten oil is stronger than that produced by Amuay oil at an equal oil concentration, probably because the waxy Zelten material forms a semi-solid structure. In addition, as will be seen from FIGURE 3, waxy Zelten oil penetrates the sand surface more easily than Amuay oil and a thicker, and therefore stronger, film is built up before optimum strength is reached.

In a further series of tests sprayed surfaces were weathered for 25 days at 120° F. and the effects of this prolonged treatment on penetration and mechanical strength of films observed. The penetration of sand by the Zelten oil was found to increase considerably over the period of 25 days and the mechanical strength of the film increased correspondingly. No change occurred in the penetration of Amuay oil over this period and the film strength increased only slightly.

The effect of adding wax to Amuay oil was investigated and it will be seen, by reference to Table III, that the addition of 13% by weight of slack wax improved the stabilisation of 1,000 second Amuay fuel oil nearly three times.

TABLE III.—Effect of Added Wax on Efficiency of Dune Stabilization

|  | Oil cover to prevent failure at wind velocity of 40 m.p.h., tons/hectare |
|---|---|
| Amuay 1,000 sec. | 0.35 |
| Amuay 1,000 sec. plus 13% wax | 0.13 |
| Zelten 1,000 sec. | 0.10 |

As previously mentioned sand dunes and other formations having a loose, and hence unstable, surface are more or less deficient in essential plant nutrients and particularly in the trace elements necessary for the most effective plant growth. The essential elements are nitrogen, phosphorus, potassium, calcium, magnesium, sulphur, iron, manganese, copper, zinc, boron and molybdenum and it has been shown that the addition of extremely small amounts, particularly of the last eight, of these elements to soils deficient in them can have beneficial effects on plant growth lasting over a period of several years. For example the addition of one ounce of molybdenum trioxide per acre has been found to give remarkable results. Other essential constituents may be applied in the following amounts per acre in the form of the compounds mentioned namely, boron (3½ lbs.), copper sulphate (7 lbs.), zinc sulphate (7 lbs.), and manganese sulphate (14 lbs.) It will be appreciated that the particular compounds and amounts mentioned are by way of example only.

It has now been found that compounds, containing one or more of the essential, particularly trace, elements above-mentioned, may be incorporated in the hydrocarbon oils hereinbefore defined and that the product not only functions as a soil stabilising agent but also assists the growth of vegetation. The trace element compound or compounds may be incorporated in the hydrocarbon oil by solution, emulsion or dispersion, depending upon the nature of the compound selected. For example the selected compounds may be in the form of finely divided inorganic water soluble salts dispersed in the stabilising oil, or as organic oil soluble compounds such as soaps and chelates. The compound, or range of compounds, to be incorporated in the stabilising oil may be selected to raise or lower the pH of the soil to correct excess acidity or alkalinity as the case may be. It will be found that some soils have a high pH which reduces the availability of certain trace elements to vegetation. This may be corrected by selecting from the essential plant nutrients compounds which will lower the soil pH such as sulphur which oxidises to $SO_2$ or sulphur containing compounds, for incorporation in the soil stabilising oils.

The stabilising oils of the present invention are suitably applied by pumping from a bulk source, with heating if necessary, according to the viscosity of the oil and the ambient temperature, and spraying through appropriate spraying equipment. The spray should be applied in the form of fine droplets and in sufficient amount to prevent undue top soil movement under the local conditions of wind and rain but not in excessive amounts otherwise breathing of the soil and intake of moisture is prevented or seriously minimised. It has been found that the amount of oil required is influenced by the particle size of the loose surface soil and by the velocity of the prevailing winds; an increase in either of these factors necessitates an increase in the amount of oil required. It has been found that the amount of oil required may vary from about three quarters of a ton to about two and a half tons per hectare depending upon the average grain size of the soil and the wind velocity in the area concerned.

The stabilising oil preferably is mildly preheated, for example to about 3° F. or more above its ambient temperature, before spraying. This may be done by passing it from a bulk tank through a heat exchanger to a pump. It has been found that the oil can be sprayed directly without difficulty at ambient temperatures above 50° F., when its Redwood viscosity at 100° F. is between 200 and 1200, but at temperatures of 40° F., or lower, the oil is preferably heated. At low ambient temperatures comparatively high spraying pressures are desirable, e.g., pressures of 270 to 300 p.s.i. for temperatures below 60° F., but for temperatures of 60° F. and above lower pressures are sufficient, e.g., 150 p.s.i. At the temperatures and pressures referred to good atomisation of the sprayed fuel oil has been obtained. Spraying nozzles of the flat jet type have been found to be suitable, and, using such nozzles, the spray emerges as a fan breaking into individual droplets shortly after leaving the nozzle. The size of the droplets can be controlled by changing the atomisation pressure. This permits a choice of spraying conditions to suit different wind and surface requirements.

Table IV shows preferred viscosities of the stabilising oils at ambient temperatures of 30° F., 50° F., and 70° F., respectively.

TABLE IV

| Air Ambient Temperature, ° F. | Viscosity, Redwood I secs., at 100° F. |
|---|---|
| 30 | 200–600 |
| 50 | 200–1,200 |
| 70 | 200–2,500 |

The temperature of the oil at the spraying nozzle should be such that the viscosity of the oil at the nozzle does not exceed 10,000 Redwood I seconds.

On dry sand the spray does not form a continuous film immediately after spraying but, after two or three days the individual droplets join to give a uniform cover. Localised lack of continuity in the film is necessary to allow the stabilized soil to be recharged with moisture during rainfall. When areas already planted with seedlings are being sprayed care must be taken to avoid coating the seedlings too heavily with oil and this may be achieved by spraying around the plants and close to the ground.

Effective stabilisation of unstable soils, for example sand dunes, requires a suitable distribution of the stabilising oil over the dune surface. Where seedlings have already been planted on the area to be sprayed the spray must be delivered sufficiently closely to the ground to avoid undue contamination with the spray oil of the foilage of the seeedlings. The surface of unstable soil formations, particularly sand dune formations, makes it necessary to ensure that the spraying nozzles are capable of adjusting themselves to travel at a substantially constant height above the ground. Hand operated lances, fitted with spraying nozzles, may be employed for this purpose but the rate of progress is slow.

It has been found that the spraying operation is materially speeded up if a suitably constructed boom is employed. The boom may be hand operated.

A suitable boom consists of a pipe, appropriately of one half to two inches in diameter, and formed of a suitably rigid or semi-rigid material, conventionally metal, mounted upon two or more skids in such a way that it clears the ground to the required degree; the ground clearance will be normally at least eighteen inches and, preferably, from two to three feet. A draw bar, or its mechanical equivalent, is fitted to the skid-pipe assembly so that the unit can be pulled or pushed as desired. Hoses, that are sufficiently flexible to trail easily on the ground and to adjust themselves to ground surface deformations, are fitted to the substantially horizontal pipe and a shoe is fitted to the free end of each hose in such a way that it will trail on the ground and at the same time maintain the free end of the hose at a suitable distance, preferably 6 to 9 inches, above the ground. Spraying nozzles are fitted to the end of each hose and adjusted so that a set of sprays will give a uniform ground coverage. This may be achieved by the employment of several suitable nozzles, for example flat jet nozzles, on each hose arranged to spray in a suitable, for example, semi-circular, pattern in a plane substantially parallel to the ground.

When the device is used for spraying formations such as sand dunes a plurality of sand smoothing devices may be fitted to the main pipe so that sand ripples and other small deformations are cleared before spraying. The smoothing device may consist of a strip of suitable material, for example rubber, canvas, metal or wood. When working in areas planted with, for example, tree seedlings the smoothing device should consist of a series of short elements adapted to pivot so as to be deflected by and freely pass seedlings with which it may come into contact.

The boom is fed with the oil to be sprayed by means of a suitable pipe, preferably of light and flexible character, attached at its remote end to a suitable pumping rig.

The skids may be lined with a material of low frictional resistance.

To assist the operator a winch line can be fitted to the boom said winch line being conveniently provided, preferably at the boom end, with appropriate starting and stopping means which may be mechanical, pneumatic or electrical. Alternatively the boom itself can be fitted with a suitably operated winch winding on an anchored wire. The boom may be provided with valves, pressure gauges and other devices to facilitate the proportioning of the oil.

FIGURE 4 of the accompanying drawings illustrates a spray boom in which skids 1 are provided with end pieces 2, hinged at 3, to support oil conduit pipes 4. The oil conduit pipe 4 is attached to a tubular support 5 which bears a rod or tube 6 carried, by brackets 7, upon skids 8. A manifold 9 receives oil through a hose the end of which is shown at 10. Oil is fed from a pumping unit by a hose and enters the manifold 9, at 10, and thence passes via hose connection 11, supporting tubes 12 and hose connections 13 to nozzles 14.

Suitable equipment for conveying and applying the stabilising oils of the invention comprises in combination, a product tank mounted upon a mobile carrier, oil recirculation and delivery pipe means, a pump in circuit with said oil recirculation and delivery means, a prime mover, for example a diesel engine which may be the prime mover of the mobile carrier, adapted to operate said pump, heating means associated with said oil recirculation and delivery means, said heating means suitably being a heat exchanger heated by, for example, exhaust gases from the prime mover, means associated with said product tank and recirculation and delivery means to control the quantity of recirculated oil, spraying hoses attached to the oil delivery means leading to spray devices, suitably spray lances or booms and spraying nozzles associated with said spraying means said nozzles suitably being adapted to deliver the stabilising oil in a semicircular spray.

If the oil recirculation is sufficiently vigorous the oil will become heated to an extent which is adequate in most cases and, in such cases, separate oil heating means may be dispensed with. Vigorous recirculation also helps to shear the oil and thus reduce its viscosity.

In the accompanying drawings, FIGURE 5 is a diagrammatic layout showing a spraying unit suitable for applying the soil stabilising oils.

In the drawing $V_1$ is a gate valve, suitably of 2½ inches diameter, $V_2$ is a three-way valve, appropriately of 2 inches diameter, $V_3$ is a pressure relief valve which is adjustable to vary the pressure, for example within the range of 100 to 300 p.s.i.g., $V_4$ is a gate valve (suitably of 1 inch diameter) and $H_1$ are flexible hoses (suitably 1 inch internal diameter) to spray lances, spray booms or equivalent means (not shown). G is a pressure gauge (suitably 500 p.s.i.), $P_1$ is a perforated pipe (suitably of six inches diameter) within the product tank T, the perforations of which are adapted to regulate the flow of oil from the tank T by ensuring that only a comparatively small quantity of oil is pumped around and heated in any given time. $L_1$ and $L_2$ are flexible hoses (conveniently of 2 inches and 2½ inches internal diameter respectively), A is a heat exchanger, heated by exhaust gases from a diesel engine D, and B is a pump driven by the engine D.

It is desirable that the capacity of the pump B is sufficient to promote vigorous recirculation of the oil in the recirculation circuit and a suitable capacity is from three to ten times the draw-off capacity of the hoses $H_1$. This allows the oil to be recirculated at a rate that is a multiple of the draw-off rate whereby a rise in the temperature of the oil, with consequent lowering of the viscosity is effected.

As will be seen from the drawing, oil is circulated through the lines $L_1$ and $L_2$ and the hoses $H_1$ according to the setting of the respective valves $V_1$, $V_2$, $V_3$ or $V_4$, in the system, under the action of the pump B driven by the engine D. Oil passing through the hoses $H_1$ is supplied to spraying lances or their equivalents and delivered to the soil through appropriate spraying nozzles. The oil, which passes through the circulating system in a controlled manner under the influence of the perforated pipe $P_1$, may be heated by the heat exchanger A.

It will be obvious that the system shown in the drawing is by way of example only and that mechanical equivalents for the integers of the system may be substituted. For example, means of controlling liquid recirculation in a circulating system alternative to the perforated pipe $P_1$ shown in the drawing are known in themselves and may be substituted therefor; again, oil may be delivered from one or more product tanks to a separate container through which the recirculation system may function.

It will be appreciated that, particularly for operation in difficult terrain such as sand dune country, the mobile product carrier must be suitably designed to accommodate the product tank and accompanying equipment and to traverse the type of country in which it is intended to operate. The product tank, mounted on the mobile carrier, should have as low a centre of gravity as possible and, preferably, is fitted with baffles or equivalent means to minimise longitudinal and lateral surging of the oil in the tank.

As previously mentioned, the primary objects of the invention are to stabilise unstable soils and foster the growth of vegetation. The invention permits soils of the type to which it is to be applied to be directly seeded. This has the economic advantage, particularly in growing trees, of avoiding the necessity of firstly germinating the seeds in nurseries and afterwards having to plant out the seedlings at the selected site.

What I claim is:

A method of stabilising sand and other top soil from deterioration through wind and water erosion which comprises applying to said sand and top soil a wax-containing petroleum hydrocarbon oil having a viscosity of from about 200 to about 1200 seconds Redwood I at 100° F. in an amount of between about ¾ of a ton and 2½ tons of said oil per hectare of sand and top soil area, thereby substantially preventing sand and top soil deterioration without substantially preventing breathing and moisture intake of said sand and top soil.

References Cited by the Examiner

UNITED STATES PATENTS

| | | | |
|---|---|---|---|
| 1,882,377 | 10/1932 | Whittelsey | 47—9 |
| 2,802,303 | 8/1957 | Weeks | 47—9 |
| 2,903,189 | 9/1959 | Patton | 239—129 |
| 2,927,402 | 3/1960 | Goren et al. | 47—58 |
| 2,961,799 | 11/1960 | Coe | 47—9 |
| 3,061,974 | 11/1962 | Louis et al. | 47—9 |
| 3,073,530 | 1/1963 | Broyhill | 239—168 |
| 3,077,054 | 2/1963 | Niemeijer | 47—9 |
| 3,094,809 | 6/1963 | Kaufman et al. | 47—9 |

ABRAHAM G. STONE, *Primary Examiner.*

R. E. BAGWILL, *Assistant Examiner.*